United States Patent Office 2,881,652
Patented Apr. 14, 1959

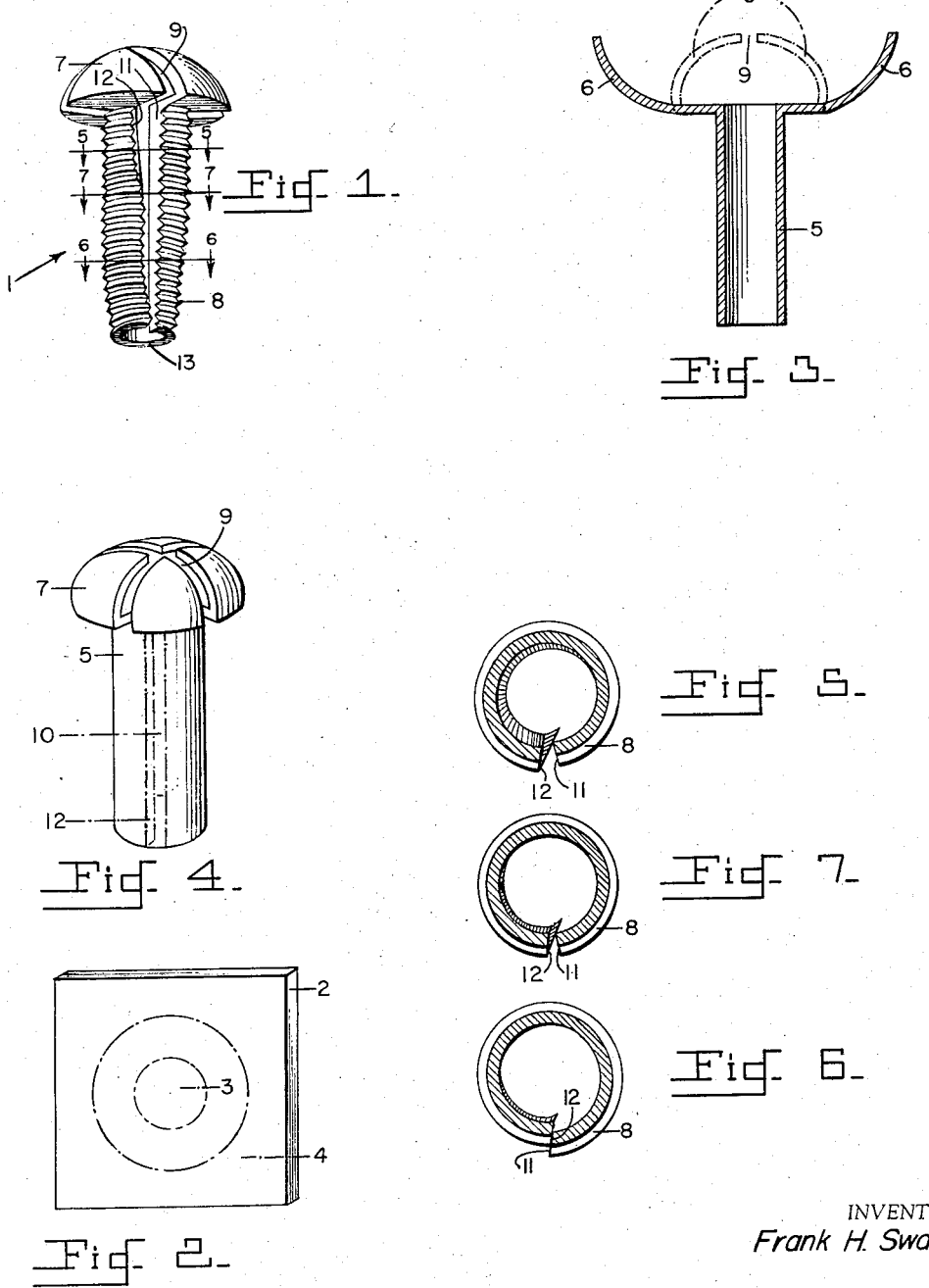

2,881,652
HOLLOW SELF-TAPPING AND SELF-LOCKING SCREW

Frank H. Swaim, Silver Spring, Md.

Application July 14, 1955, Serial No. 521,961

1 Claim. (Cl. 85—47)

This invention relates to machine screws and particularly to a type screw adapted to self-tapping and self-locking performance.

One object of the invention is a new and novel self-tapping and self-locking screw.

Another object is a self-tapping self-locking machine screw which can be fabricated from a single piece of sheet metal.

A further object is a self-tapping self-locking machine screw which lends itself to economical mass production.

One further object is a new and novel method of fabricating a machine screw of the type described and claimed.

The specific nature of the invention as well as other objects and advantages thereof will clearly appear from the following description and drawings, in which:

Fig. 1 is a perspective view of a screw in accordance with the invention;

Fig. 2 is a perspective view of a blank from which the screw could be fabricated;

Fig. 3 is an axial sectional view of the screw in one stage of its manufacture;

Fig. 4 is a perspective view of the screw in a later stage of its manufacture;

Fig. 5 is a cross section of the screw taken on line 5—5 of Fig. 1;

Fig. 6 is a cross section of the screw taken on line 6—6 of Fig. 1; and

Fig. 7 is a cross section of the screw taken on line 7—7 of Fig. 1.

The machine screw which is indicated generally by numeral 1, Fig. 1, is formed from a single sheet metal blank 2, Fig. 2. The portion 3 of blank 2 is drawn and the portion 4 of blank 2 is formed so that the screw, at one stage of its manufacture, has a longitudinal section as shown in Fig. 3. The tubular shank 5, Fig. 3, is drawn from portion 3 and the tabs 6 from which the head 7 is made are formed from portion 4.

The partially formed screw is placed on a mandrel, not shown, and threads 8 are "chased" upon shank 5. The tabs 6 are then bent upward to form head 7, cross slots 9 remaining to receive the blade of a screwdriver for driving the screw into the workpiece. A longitudinal slot 10 is cut in shank 5 to provide a leading edge 11 and a trailing edge 12.

The shank 5 is further formed by flaring outwardly the portion adjacent edge 12 in the vicinity of line 5—5, Fig. 1, and by flaring inwardly the portion adjacent edge 12 in the vicinity of line 6—6. It should be noted that edge 12 abuts edge 11 adjacent the toe 13 of screw 1 for the purpose of giving support to edge 11 as described hereinafter.

An alternate means of forming trailing edge 12 is to graduate the edge from maximum outward deviating adjacent the screw head to maximum inward deviation adjacent the screw toe.

As the screw 1 is driven into the hole provided therefor in the workpiece, not shown, the screw threads at the leading edge 11 begin to cut female threads in the workpiece, the depression of the trailing edge exposing "cutting teeth" adjacent the leading edge. Inasmuch as the trailing edge 12 abuts the leading edge 11 adjacent toe 13, the screw is prevented from compressing adjacent the toe 13 as the first cutting threads take their bite. The reduced diameter of the screw adjacent the toe provides a pilot for guiding the screw into the hole.

There is no tendency for the screw to lock in the workpiece until the screw has penetrated the workpiece beyond line 7—7, Fig. 1. Beyond that point the trailing edge 12 deviates outwardly. The outward deviation causes the screw threads to press against the newly cut female threads. Pressure is exerted against the female threads by the screw threads as the trailing edge resists being depressed. The resulting friction provides the primary locking action.

An additional locking action can be achieved by providing the trailing edge with a bevel. Any attempt to back the screw out of the workpiece will cause the sharp edge to cut into the workpiece and prevent removal of the screw therefrom.

If the screw is intended for removal from the workpiece the beveled edge should not be provided. Friction locking will suffice for most purposes.

In order to give the screw the required amount of strength it should be tempered by heat treatment.

Instead of being fabricated from sheet metal, it will be apparent that the screw could be made in the conventional manner on a screw machine, then drilled to provide a tubular screw, then slotted and deformed to provide the construction shown. Alternatively, a double-slotted construction could be provided with two slots 180 degrees apart and similarly deformed so that the action takes place simultaneously at two points which are symmetrical with respect to the axis of the screw. This double-slot arrangement could also be provided in a solid construction by slotting a machined screw all the way through and bending the two legs so that the trailing and leading edges have the required relationship.

It will be apparent that the embodiment shown as well as the method of manufacture described is only exemplary and that various modifications can be made in construction, arrangement, and manufacture within the scope of the invention as defined in the appended claim.

I claim:

A self-tapping, self-locking screw having a head for engagement with a screw driving means, said screw comprising an externally threaded tubular shank of substantially uniform wall thickness attached to said head, said shank having a longitudinal cut extending radially through said wall thickness to form two opposed longitudinal edges extending from the toe end substantially to the head end of said shank portion, one of said edges being a leading edge and the other a trailing edge, the trailing edge portion of said shank being deformed inwardly at the toe end so that said edges are in contact with the leading edge projecting radially outward beyond the trailing edge to present a cutting thread edge for self-tapping action, said edges being spaced from each other throughout the rest of the shank, the trailing edge portion of the shank being deformed outwardly at the head end so that the trailing edge projects radially beyond the leading edge to present a locking edge for self-locking action, said shank substantially tapering throughout its length toward the toe.

References Cited in the file of this patent

UNITED STATES PATENTS

| | | |
|---|---|---|
| 1,874,595 | Olson | Aug. 30, 1932 |
| 2,257,441 | Wylie | Sept. 30, 1941 |
| 2,272,552 | Field | Feb. 10, 1942 |
| 2,387,720 | Davis | Oct. 30, 1945 |
| 2,549,393 | Siesel | Apr. 17, 1951 |
| 2,572,647 | Merwin | Oct. 23, 1951 |
| 2,624,228 | Brown | Jan. 6, 1953 |
| 2,636,194 | Schneider | Apr. 28, 1953 |
| 2,652,578 | Chiaberta | Sept. 22, 1953 |